Patented Apr. 21, 1953

2,635,944

UNITED STATES PATENT OFFICE

2,635,944

PRODUCTION OF GRANULAR BERYLLIUM FLUORIDE

Kenneth A. Walsh and Harley A. Wilhelm, Ames, Iowa, assignors to the United States of America as represented by the United States Atomic Energy Commission No Drawing. Application January 10, 1950, Serial No. 137,884

3 Claims. (Cl. 23—88)

This invention deals with a process for the production of beryllium fluoride and in particular with a process for producing beryllium fluoride in granular form.

For many purposes, for instance for certain reduction processes for the manufacture of metallic beryllium, beryllium fluoride is used as the starting material. It is mostly necessary that the beryllium fluoride is employed in disintegrated form; however, the use of the fluoride in dust or powder form is not desirable on account of its constituting a health hazard. For this reason, it has always been preferred to employ the beryllium fluoride in granular form.

One process of manufacturing beryllium fluoride consists in reacting beryllium hydroxide with hydrogen fluoride. Beryllium hydroxide is available in the form of a fluffy powder. It has been found that if fluorination is carried out with such a fluffy beryllium hydroxide at lower temperatures, e. g., around 200° C., the fluoride obtained has the same fluffy consistency. If higher temperatures are used, e. g., around 400° C., the beryllium fluoride is obtained in the form of a sintered cake which requires grinding in order to be usable for the above-mentioned processes whereby also some dust formation takes place. Thus, in both cases, the hazardous beryllium fluoride dust is present.

It is an object of this invention to provide a process by which beryllium fluoride is obtained in granular form without the necessity of grinding.

It is another object of this invention to provide a process for producing beryllium fluoride in which no powder or dust of fluoride is present so that there is no health hazard involved.

It has been found that fluorination of beryllium hydroxide, even when used in fluffy powdered form, with hydrogen fluoride, preferably in anhydrous form, yields directly a granular product if the critical temperature range of from 300° to 350° C. is used for the fluorination step. A reaction time of six to ten hours has been found to be satisfactory.

Although fluorination at 300° to 350° C. alone yields very satisfactory results, it has been found advantageous first to initiate fluorination at about 200° C., for example, for about five hours, and then to complete it at the critical temperature of from 300° to 350° C. By this procedure, the disadvantage of temperatures above 350° C. is avoided that beryllium hydroxide is converted to vitrified beryllium oxide which, probably because it forms a more or less impermeable surface coat, prevents complete fluorination.

In the fluorination process, care has to be taken that sufficient hydrogen fluoride-flow is provided to have the reaction

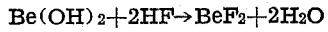

predominate over the reaction

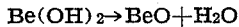

Fluorination of beryllium oxide is practically impossible under the conditions of the process.

In the following, one embodiment of the invention is described in detail for the purpose of illustration only and not for that of limitation.

Example

Three trays of Monel metal each were charged with a 1 in.-thick layer of about 7 ounces of fluffy beryllium hydroxide and inserted into a Monel tube. The tube with the trays was introduced into a furnace preheated to between 300° and 350° C. Thereafter, a total of 5 lbs. of anhydrous hydrogen fluoride was introduced into the Monel tube over a period of six hours; the hydrogen fluoride gas had a pressure of 2.5 lbs. per square inch.

After completion of the reaction, the trays were removed from the furnace and cooled in an enclosed box which contained calcium chloride to prevent hydrolysis of the fluoride. The final product had a mesh size between −20 and +50, was white in color and showed practically no tendency for dust formation. A yield of 98% was obtained.

The experiment was repeated under the same conditions as described above with the only exception that a temperature of 200° C. was used. A yield of 98% was also obtained in this instance, and the product had the same characteristics as that of the above run except that it was just as fluffy as the beryllium hydroxide used as the starting material.

For a third parallel experiment, a temperature of 400° C. was chosen. In this case, a well-sintered cake was obtained which had to be ground in order to make it suitable for use in the reduction process. The yield was only 88%, probably on account of incomplete fluorination due to a sintered surface layer.

It will be understood that this invention is not to be limited to the details given herein but that it may be modified within the scope of the appended claims.

What is claimed is:

1. A process of preparing granular beryllium fluoride comprising contacting a quiescent thin bed of fluffy beryllium hydroxide powder with anhydrous hydrogen fluoride at a temperature of about 350° C. for a period of from six to ten hours, and continuously introducing said hydrogen fluoride under pressure so as to maintain a stoichiometric excess of the hydrogen fluoride above said bed and in contact therewith.

2. The process of claim 1, wherein the temperature is between 300 and 350° C., the pressure is about 2.5 p. s. i. and the beryllium fluoride obtained is cooled in a dry atmosphere.

3. The process of claim 1 wherein contacting of the beryllium hydroxide with hydrogen fluoride is carried out in two stages, the first stage using a temperature of about 200° C. and the second stage a temperature of from 300 to 350° C., both stages being carried out from a total of from six to ten hours.

KENNETH A. WALSH.
HARLEY A. WILHELM.

References Cited in the file of this patent

UNITED STATES PATENTS

| Number | Name | Date |
|---|---|---|
| 2,303,783 | Adamoli | Dec. 1, 1942 |